United States Patent [19]
Wier

[11] Patent Number: 6,126,241
[45] Date of Patent: Oct. 3, 2000

[54] BUCKLE TENSIONER FOR A SAFETY BELT SYSTEM

[75] Inventor: Franz Wier, Göggingen, Germany

[73] Assignee: TRW Occupant Restraint Systems GmbH, Alfdorf, Germany

[21] Appl. No.: 09/050,849

[22] Filed: Mar. 30, 1998

[30] Foreign Application Priority Data

Apr. 4, 1997 [DE] Germany ................. 297 06 024 U

[51] Int. Cl.$^7$ ................................... B60R 22/36
[52] U.S. Cl. ................ 297/482; 280/806; 297/476; 297/480
[58] Field of Search .................. 297/479, 480, 297/482, 485, 476, 469, 471; 280/806, 801.1

[56] References Cited

U.S. PATENT DOCUMENTS

| | | | |
|---|---|---|---|
| 5,098,162 | 3/1992 | Forget et al. | 297/482 |
| 5,310,219 | 5/1994 | Fohl | 297/480 X |
| 5,450,723 | 9/1995 | Fohl | 297/480 X |
| 5,568,940 | 10/1996 | Lane, Jr. | 297/480 X |
| 5,607,185 | 3/1997 | Isaji et al. | 297/480 X |
| 5,676,397 | 10/1997 | Bauer | 297/480 X |
| 5,879,027 | 3/1999 | Wier | 297/480 X |

*Primary Examiner*—Peter R. Brown
*Assistant Examiner*—Stephen Vu
*Attorney, Agent, or Firm*—Tarolli, Sundhiem, Covell, Tummino & Szabo L.L.P.

[57] ABSTRACT

A buckle tensioner for a safety belt system has a buckle head, a drive device for displacing the buckle head, the drive device having an element which is driven in the case of restraint, a tension transfer means connecting the driven element to the buckle head, and an intermediate space between the buckle head and the drive device extending along the tension transfer means. The buckle tensioner further has a housing covering the intermediate space between the buckle head and the drive device and surrounding the tension transfer means. The housing is displaced relative to at least one of the buckle head and the drive device during the tensioning process.

21 Claims, 4 Drawing Sheets

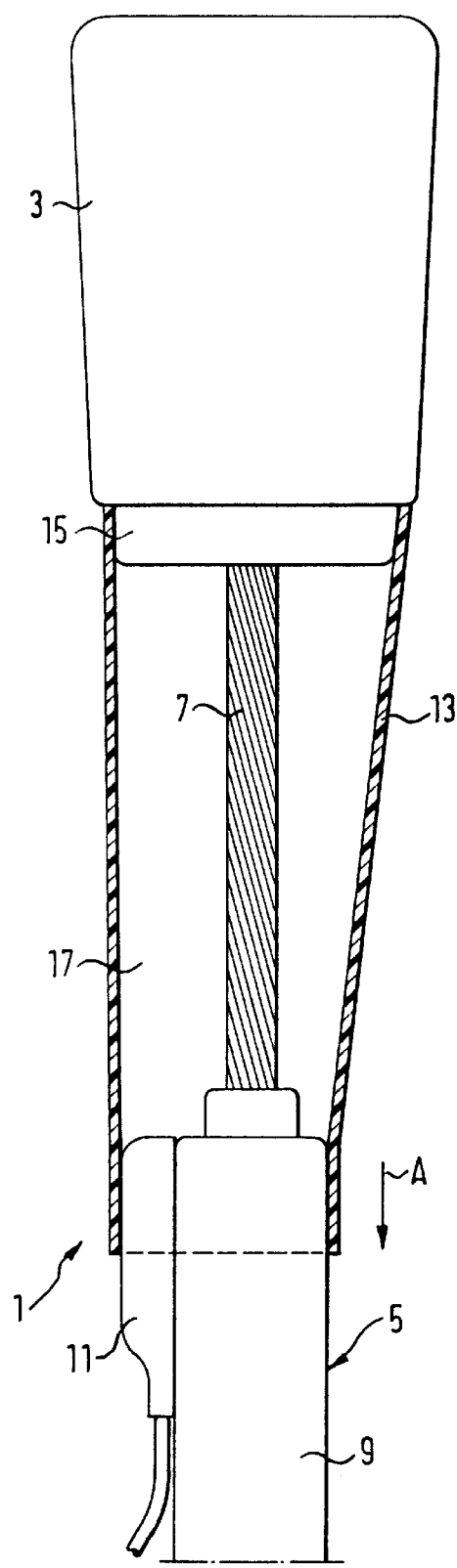
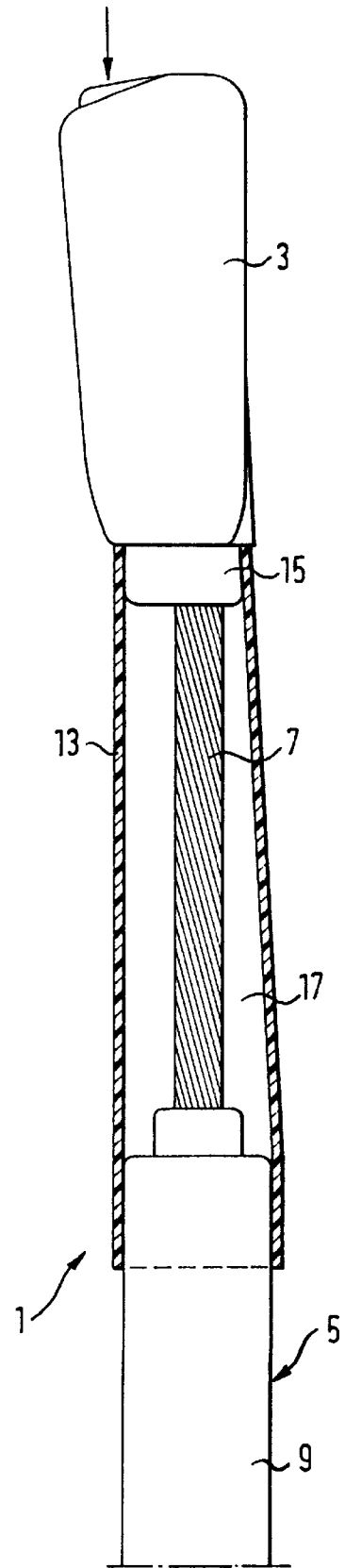

FIG. 7
FIG. 8
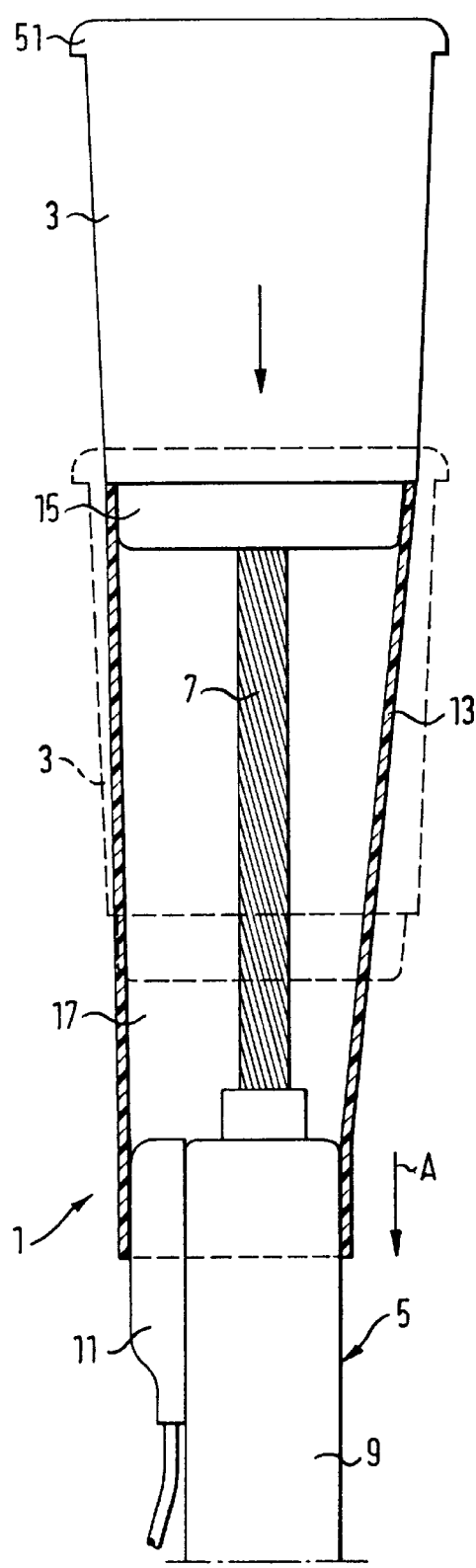
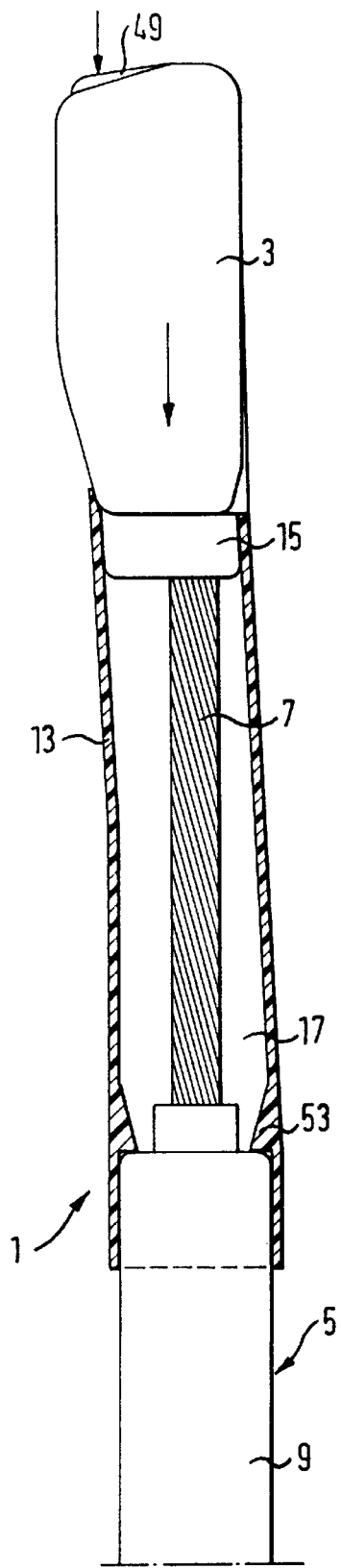

BUCKLE TENSIONER FOR A SAFETY BELT SYSTEM

TECHNICAL FIELD

The invention relates to a buckle tensioner for a safety belt system.

BACKGROUND OF THE INVENTION

A buckle tensioner moves the buckle head in the case of retraint by approximately 50 to 100 mm towards the anchorage point of the buckle tensioner, in order to remove the belt slack from the safety belt system. The tensioning process itself takes place abruptly because generally pyrotechnic drive units are provided. Parts hindering the tensioning process, for example parts transported in the vehicle, must in no way protrude into the intermediate space between the buckle head and the drive device because the buckle head would strike against this part and it could not be displaced through the entire tightening distance. In addition, a risk of injury to occupants of the vehicle exists in known buckle tensioners for the instance which in fact scarcely occurs in practice but is theoretically not ruled out, that during the tensioning process, fingers of the occupant of the vehicle protrude into the intermediate space between buckle head and drive device, which would then be jammed.

BRIEF SUMMARY OF THE INVENTION

The invention provides a buckle tensioner in which both the risk of an accident and also the risk that the tightening distance is limited by parts extending into the intermediate space between buckle head and drive device is ruled out.

The buckle tensioner according to the invention has a buckle head, a drive device for displacing the buckle head, the drive device having an element which is driven in the case of restraint, a tension transfer means connecting the driven element to the buckle head, and an intermediate space between the buckle head and the drive device extending along the tension transfer means. The buckle tensioner further has a housing covering the intermediate space between the buckle head and the drive device and surrounding the tension transfer means. The housing is displaced relative to at least one of the buckle head and the drive device during the tensioning process.

The housing can be constructed very simple and is, in addition, able to be mounted quickly. The buckle head and/or the drive device travel, viewed relatively, into the housing during the tensioning process. It is very important that the housing is stiff enough in order to prevent an occupant from pressing together the housing. A bellow does not define a housing, i.e. a protection means according to the invention since a bellow is soft and flexible and has folds which protrude into the intermediate space. Therefore, the fingers of the occupant may protrude into the folds and into the intermediate space.

The housing can be an elongated cylindrical or tubular body surrounding the tension transfer means completely in the circumferential direction. It is preferably fastenend to the buckle head or to the drive device and is slipped over the respectively other of the two parts on the other side of the latter, so that it can be displaced along the outer surface of the latter in the case of restraint.

The drive device, which preferably is a piston/cylinder unit, comprises a cylinder on which an ignition unit is secured on the outer side in the region of the end facing the buckle head. The housing projects in axial direction not only partially over the cylinder but also over the ignition unit.

The housing can also be of a material which is to a certain, limited extent elastically flexible, which permits a certain bending. This can be advantageous for example when the tension transfer means is constructed so as to be flexible, for example as a tension cable, and the position of the belt buckle relative to the drive device is not clearly defined.

According to one embodiment the housing consists not of one but of several housing parts which, during the tensioning process, are able to be pushed into each other in the manner of a telescope. The housing or housing parts can then also be formed in one piece on the buckle head housing or on the housing of the drive device.

In an embodiment in which the buckle tensioner is integrated in a vehicle seat and the vehicle seat has a lateral recess to receive the buckle tensioner, the housing is constructed in a shell-shaped manner. As it is shielded on one side by the vehicle seat, it no longer has to completely surround the tension transfer means externally, but only the region which is freely accessible from the exterior.

DETAILED DESCRIPTION OF THE DRAWINGS

Figure 3:
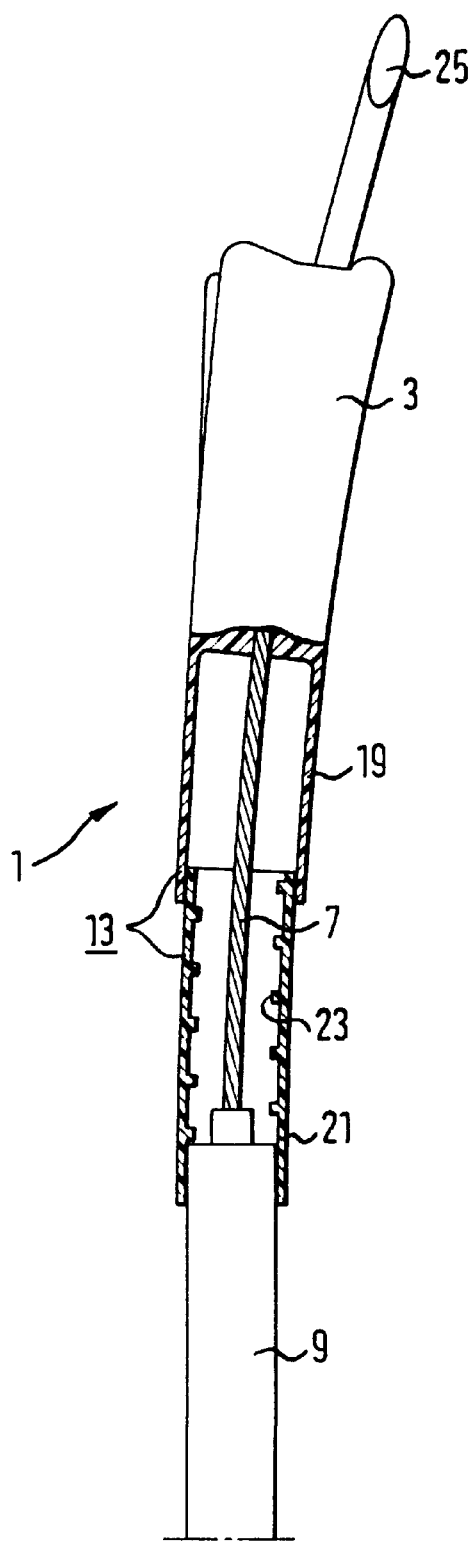
Figure 4:
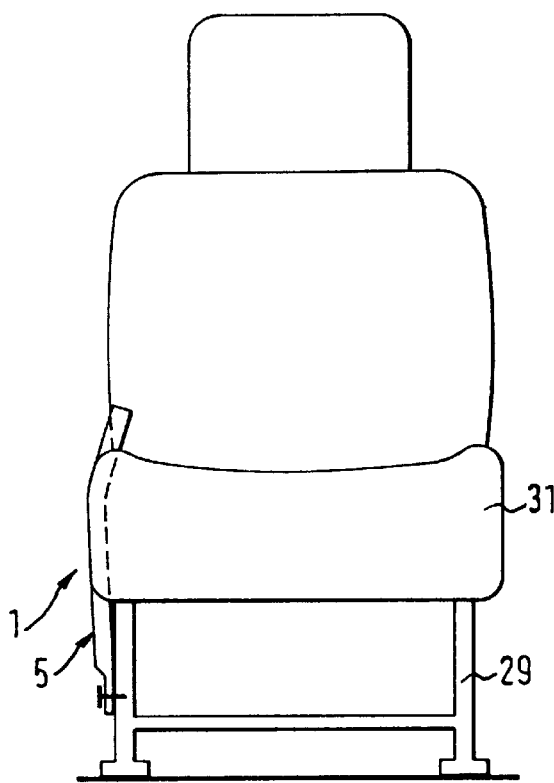
Figure 5:
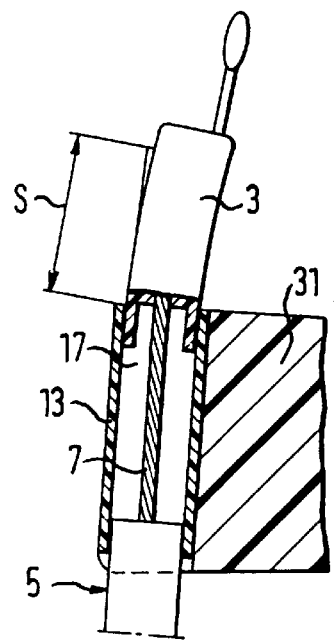
Figure 6:
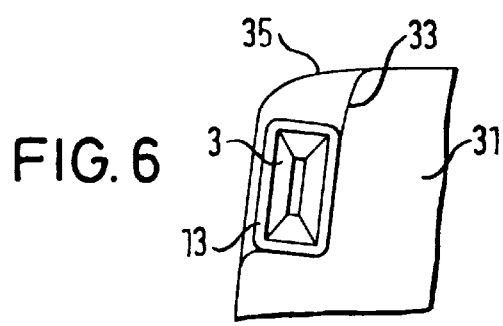

FIG. 1 shows a first embodiment of the buckle tensioner according to the invention, in front view with the housing cut open, FIG. 2 shows a side view of the buckle tensioner according to FIG. 1, FIG. 3 shows a second embodiment of the buckle tensioner according to the invention, with the tension transfer means subjected to a bending load, FIG. 4 shows a front view onto a vehicle seat with integrated buckle tensioner according to the invention, FIG. 5 shows a cross-sectional view through a part of the seat part and through the integrated buckle tensioner according to FIG. 4, FIG. 6 shows a top view onto the seat part of the vehicle seat shown in FIG. 4, in the region of the buckle tensioner, FIG. 7 shows a third embodiment of the buckle tensioner according to the invention in a front view with housing cut open, and FIG. 8 shows a side view of the buckle tensioner according to FIG. 7.

DETAILED DESCRIPTION OF PREFERRED EMBODIMENTS

In FIG. 1, a buckle tensioner 1 for a safety belt system is shown, which has a buckle head 3, of which only the outer housing is shown, a drive device 5 in the form of a piston/cylinder unit and also a tension transfer means 7 in the form of a tension cable. The tension transfer means 7 connects the buckle head 3 with an element which is driven in the case of restraint, namely the piston which is not shown in further detail. On the outer side of the cylinder 9, an ignition unit 11 is fastened, which serves to ignite a pyrotechnical propellant (not shown) in the case of restraint. The tension transfer means 7 is completely surrounded in circumferential direction by a housing 13. The housing 13, which is of elastic plastic, for example PE, is thin-walled and has a thickness of only 0.5 to 0.7 mm, whereby it is given a certain bending elasticity. However, the housing 13 is stiff enough to prevent it from being pressed together by the occupant. On the outer housing of the buckle head 3, in the region of the end facing the drive device 5, a shoulder 15 is provided, onto which the housing 13 is placed with a press fit. The geometry of the housing 13 in the region of its end on the drive side, where it is slipped over the end of the drive device 5 facing the buckle head 3 and the ignition unit 11, is adapted relatively exactly to the outer contour of the drive device 5 and the ignition unit 11. However, a minimal play is provided between the housing 13 and the outer contour of drive device 5 and ignition unit 11, enabling a displacement of the housing 13 in axial direction, more detailed in the direction of the arrow A during the tensioning process.

The housing 13 which is constructed as a separate part represents an extension of the buckle head housing to beyond the end of the cylinder 9 facing the buckle head 3. The contour adapted to the buckle head housing at the end of the housing 13 on the buckle head side continues towards the end on the drive side into the outer contour of drive device 5 and ignition unit 11, so that the buckle tensioner 1 has a closed outer contour towards the exterior without distinct recesses or undercuts. The housing 13 covers an intermediate space 17 around the tension transfer means 7 and between the buckle head 3 and the drive device 5 toward the exterior, so that it is ruled out that parts, such as parts which are to be transported, pieces of clothing or even the fingers of the occupant of the vehicle reach into this intermediate space 17 into which the buckle head 3 moves in the case of restraint as it is possible with a bellow.

If in a case of restraint the ignition unit 11 ignites the propellant and the piston moves the tension transfer means 7 and hence the buckle head 3 downwards, the latter also takes with it the housing 13 in its movement downwards. The housing 13 slides unimpeded along the outer surface of the cylinder 9 and along that of the ignition unit 11, because no projecting parts are provided either on the cylinder 9 or ignition unit 11.

In the embodiment illustrated in FIG. 3, the housing 13 is composed of two housing parts which are displaceable into each other in the manner of a telescope, the upper housing part 19 forming a pot-like extension of the buckle head housing, i.e. being connected in one piece with the buckle head housing. The lower housing part 21, which projects into the upper housing part 19, is fixedly connected with the cylinder 9 and has a thickened region 23, running in a spiral form, and also regions with small wall thickness therebetween, so that altogether a bending elasticity is achieved. This has the advantage that the housing parts 19, 21 can adapt to an arc-shaped path of the tension transfer means 7, as is indicated in FIG. 3. The buckle head 3 is in fact inclined in the direction of the occupant of the vehicle when the insertion tongue 25 is introduced. The housing 13 can possibly also have recesses, in order to give it the necessary bending elasticity.

In the embodiment illustrated in FIGS. 4 to 6, the buckle tensioner 1 is integrated in the vehicle seat and the drive device 5 is fastened to the seat frame 29. The seat part 31 of the vehicle seat, as can be seen from FIG. 6, has on its rear corner a recess which is dimensioned so that the buckle head 3 and the housing 13 do not project laterally with respect to the seat part 31. The housing 13 can be constructed as a hollow body which is closed in circumferential direction or as a shell which closes off the intermediate space to the exterior. In the embodiment illustrated in FIG. 5, the housing 13 is not fastened to the buckle head 3, but rather either to the seat part 31 or to the drive device 5. During the tensioning process, the buckle head 3 penetrates almost completely into the intermediate space 17. The tightening path is marked by S.

FIG. 6 shows two embodiments of the housing 13, which differ from each other by different outer contours. On the one hand, it is possible that the housing 13 has a wall 33 which runs along the recess of the seat part 31, on the other hand the housing 13 can have a wall 35 which runs on the side of the buckle tensioner facing away from the seat part 31 and defines the outer contour of the seat part 31 without the recess for the buckle tensioner.

In the embodiment shown in FIGS. 7 and 8, the buckle head 3 penetrates almost completely into the housing 13 in the case of restraint which, in so doing, widens. The position of the buckle head 3 after the tensioning process is indicated by broken lines. Two projections 53 on the inner side on the housing 13, lying opposite each other and visible in FIG. 8, prevent a movement of the housing 13 relative to the drive device in the case of restraint. In the region of its upper end, two opposed lateral protrusions 51 are constructed on the buckle head 3 with which the buckle head 3 strikes against the upper end face of the housing 13. The protrusions 51 prevent the buckle head 3 from penetrating too deep into the housing 13 and prevent the release button 49 from subsequently no longer being able to be actuated. The projections 53 can be constructed so that they yield laterally when the protrusions 51 meet the housing 13 and only permit a relative movement of the housing 13 to the drive device in the final phase of the tensioning process. In this embodiment, each of the buckle head 3 and the drive device 5 accordingly move relative to the housing 13.

Depending on the position of installation, the housing 13 can be partially open in the circumferential direction.

What is claimed is:

1. A buckle tensioner for a safety belt system, said buckle tensioner comprising:

a buckle head having a buckle head housing, said buckle head having an outer side;

a drive device for displacing said buckle head, said drive device having an outer side;

said drive device having an element which is driven upon activation of said drive device;

a tension transfer means connecting said driven element to said buckle head;

an intermediate space between said buckle head and said drive device which extends along said tension transfer means; and a stiff housing covering said intermediate space between said buckle head and said drive device and surrounding said tension transfer means, said housing being fastened to a first one of said buckle head and said drive device;

said housing having a contour adapted to said buckle head housing at an end of said housing on a buckle head side and continuing towards an opposite end on a drive side into an outer contour of said drive device, so that parts do not reach into said intermediate space when said buckle head is displaced on activation of said buckle tensioner;

said housing being displaced relative to a second one of said buckle head and said drive device during the tensioning process, said housing being slipped onto said a second one of said buckle head and said drive device on said outer side.

2. A buckle tensioner according to claim 1, wherein said housing is an elongated tubular body which completely surrounds said tension transfer means in a circumferential direction.

3. A buckle tensioner according to claim 1, wherein said buckle head has an end facing said drive device and has a shoulder at said end onto which said housing is pushed.

4. A buckle tensioner according to claim 1, wherein said buckle head has a release button and has at least one laterally protrusion beneath said release button, said buckle head penetrating into said housing up said protrusion upon activation of said drive device.

5. A buckle tensioner according to claim 1, wherein said housing has an inner side and has at least one projection protruding on said inner side, which prevents a movement of said housing relative to said first one of said buckle head and said drive device.

6. A buckle tensioner according to claim 1, wherein said drive device is a piston/cylinder unit with a cylinder having two axial ends and with a piston, an ignition unit being fastened externally on said cylinder in an end region of said cylinder facing said buckle head, and wherein said housing is at least partially slipped over said cylinder and said ignition unit.

7. A buckle tensioner according to claim 1, wherein said housing has regions with a reduced wall thickness.

8. A buckle tensioner according to claim 1, wherein said housing can be bend elastically transversely to a longitudinal extent of said housing.

9. A buckle tensioner according to claim 1, wherein said buckle head has a buckle head housing and wherein said housing covering said intermediate space is an extension of said buckle head housing.

10. A buckle tensioner according to claim 1, wherein said housing consists of several housing parts, which are pushed telescopingly into each other during the tensioning process.

11. A buckle tensioner according to claim 10, wherein a first housing part is fastened on said buckle head and a second housing part is fastened on said drive device.

12. A buckle tensioner according to claim 1, wherein said buckle tensioner is adapted to be integrated into a vehicle seat having a seat part, and wherein said seat part has a lateral recess to receive said buckle tensioner.

13. A buckle tensioner according to claim 12, wherein said housing is constructed in a shell-shaped manner and surrounds said buckle tensioner in a region of said tension transfer means on a side facing away from said seat part.

14. A buckle tensioner for a safety belt system, said buckle tension comprising:

buckle head having an outer side;

a drive device for displacing said buckle head, said drive device having an outer side;

said drive device having an element which is driven upon activation of said drive device;

a tension transfer means connecting said driven element to said buckle head;

an intermediate space extending from said buckle head to said drive device along said tension transfer means and into which said buckle head is displaced on activation of said buckle tensioner; and a stiff housing covering said intermediate space in a circumferential direction between said buckle head and said drive device and surrounding said tension transfer means, said housing being fastened to a first one of said buckle head and said drive device and engaging said outer side of a second one of said buckle head and said drive device;

said housing sliding along said outer side of said second one of said buckle head and said drive device during the tensioning process.

15. A buckle tensioner according to claim 14, wherein said buckle head has an end facing said drive device and has a shoulder at said end onto which said housing is pushed.

16. A buckle tensioner according to claim 14, wherein said buckle head has a release button and has at least one laterally protrusion beneath said release button, said buckle head penetrating into said housing up said protrusion upon activation of said drive device.

17. A buckle tensioner according to claim 14, wherein said housing has an inner side and has at least one projection protruding on said inner side, which prevents a movement of said housing relative to said first one of said buckle head and said drive device.

18. A buckle tensioner according to claim 14, wherein said housing can bend elastically transversely to a longitudinal extent of said housing.

19. A buckle tensioner according to claim 14, wherein said buckle head has a buckle head housing and wherein said housing covering said intermediate space is an extension of said buckle head housing.

20. A buckle tensioner according to claim 14, wherein said housing consists of several housing parts, which are pushed telescopingly into each other during the tensioning process.

21. A buckle tensioner according to claim 14, wherein said buckle tensioner is adapted to be integrated into a vehicle seat having a seat part, and wherein said seat part has a lateral recess to receive said buckle tensioner.

* * * * *